Nov. 8, 1938.                W. O. LUERTZING                2,136,170
                               GLASS FILTER
                            Filed Dec. 15, 1936
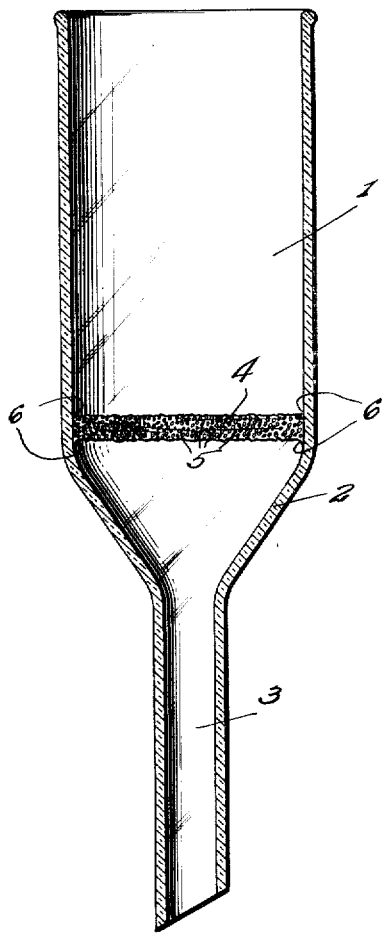
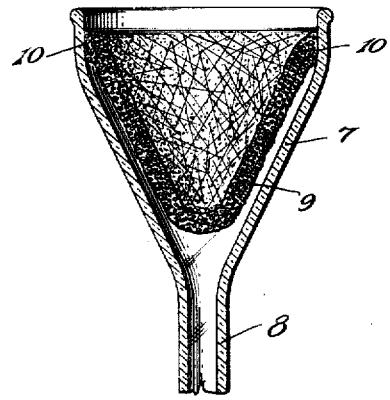
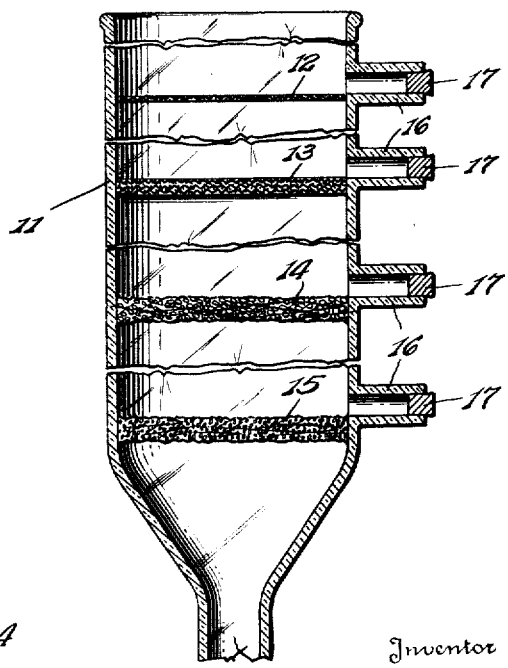
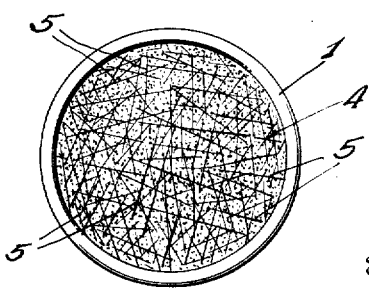
Inventor
W. O. Luertzing.
By Ross J. Woodward,
Attorney Patented Nov. 8, 1938

2,136,170

UNITED STATES PATENT OFFICE 2,136,170

GLASS FILTER

Walter O. Luertzing, Vineland, N. J., assignor to Ace Glass Incorporated, Vineland, N. J., a corporation of New Jersey Application December 15, 1936, Serial No. 116,005

3 Claims. (Cl. 210—205)

This invention relates to a filter of the glass type used in scientific and chemical laboratories, and one object of the invention is to provide a filter having as an element thereof a filtering disk formed of glass strands which are fused together to provide a porous body having a predetermined degree of porosity and serving very effectively to remove foreign matter from fluid passed through the filter without being detrimental to the fluid.

At the present time filters are in use consisting of a glass vessel having a filtering disk therein formed of powdered glass, the glass particles being fused to each other, but it has been found that, due to the fact that the disk is formed of powdered glass, the small particles do not always properly adhere to each other and are liable to loosen or break off from the mass of fused glass and pass through the filter with the fluid being filtered.

Therefore, another object of the invention is to so form the filtering disk that it will consist entirely of glass strands fused together and thus provide a filtering disk which is very strong and free from glass particles which are liable to break off and pass through the filter.

Another objection to forming the filtering disk of powdered glass is the fact that, in order to produce a filter of a desired porosity, the glass particles must be of a certain degree of coarseness, whereas when the disk is formed of a mass of glass strands and the mass subjected to predetermined pressure before and during the fusing operation, the strands may be packed as close together as desired and filtering disks having a limited range of porosity formed of glass strands of a given coarseness, it being understood that, by using strands of predetermined coarseness, filtering disks of any desired density and porosity may be made.

Another object of the invention is to provide a filtering disk which may be fused into a glass funnel or other vessel through which the fluid to be filtered passes and thus provide a filtering disk which is substantially integral with the body and cannot move out of its proper position therein.

The invention is illustrated in the accompanying drawing, wherein

Figure 1 is a sectional view taken vertically through a filter formed in accordance with the invention.

Figure 2 is a top plan view of the improved filter.

Figure 3 is a sectional view taken vertically through a filter of a modified construction.

Figure 4 is a sectional view of another modified form of filter.

This improved filter is intended for use to remove impurities and foreign substances from liquids and other fluids which would be injuriously affected if strained through a metal filter and in the embodiment illustrated in Figure 1 consists of a glass vessel 1 which is in the form of a cylindrical funnel having a tapered lower portion 2 terminating in a discharge spout or neck 3, a filtering disk or body 4 being mounted in the vessel at substantially the junction of the cylindrical walls of the vessel with the tapered lower portion 2 thereof. The filtering body or disk is of a special construction and is formed of a mass of glass strands, this material being known in the art as "spun glass" or "glass wool". The glass is of substantially the same quality as that from which the vessel is formed and, therefore, the filtering disk or body of porous glass after being formed can be placed in the vessel and its marginal portions fused to the walls of the vessel which are of non-porous glass. In view of the fact that the filtering disk is formed of glass strands which are fused to each other, the disk will be very strong while at the same time porous and there will be no small glass particles which are liable to break off and pass through the filter with the fluid being filtered.

When forming the filtering body or disk 4, a mass of glass strands is placed in a shaping mold of cast iron or any other desired material without particular regard to the direction in which the strands extend, although the majority of the strands will extend substantially parallel to upper and lower faces of the disk, as shown at 5 in Figure 2. After the mass of glass strands has been placed in the mold, pressure is applied to compress the mass to a predetermined thickness and density either by placing weights upon the mass of glass or in any other desired manner. This will cause the glass strands to be packed together as closely as desired to produce a filtering disk or body of predetermined porosity. The weight or other pressure applying means is left in place and the mold placed in an oven or furnace where it is subjected to sufficient heat to soften the glass strands and cause them to be fused to each other. The weight not only causes the glass to be maintained in the desired shape and at the desired density and thickness but also causes the glass strands to be fused to each other very quickly at a low temperature. After the strands have been fused to each other, the formed disk or porous filtering body is removed from the mold and may be immediately transferred to the vessel or allowed to cool until it can be readily handled and then placed in the vessel. After the filtering disk or body has been placed in the vessel, the flame of a blow torch or other heater is directed against the walls of the vessel which is formed of non-porous glass and marginal edge portions of the disk will be fused to walls of the vessel, as shown at 6. By varying the amount of pressure applied to the mass of glass strands, the density of the mass can be controlled and the porosity of the filtering disk modified within certain bounds when strands of a given coarseness are used and by using strands varying in degrees of coarseness from very coarse to very fine filtering disks of many degrees of porosity can be produced. It will thus be seen that filtering disks of practically any predetermined porosity can be produced. It should also be noted that by having the filter formed of a mass of glass strands instead of powder, the strands will extend in crossed relation to each other and be matted together and produce a filtering disk which will have great tensile strength and be free from small particles which are liable to work loose due to improper fusing or breaking off and pass through the filter with the fluid being filtered.

Instead of forming the filter as shown in Figure 1, it may be of the construction illustrated in Figure 3. Referring to this figure it will be seen that the vessel has the shape of a funnel provided with a downwardly tapered body 7 terminating in a spout or neck 8 which may be of any length desired. The filtering body 9 is formed of a mass of glass strands shaped and fused together under pressure, as previously described, but instead of being in the form of a flat disk it is of an inverted conical formation with its apex disposed lowermost and its marginal portions fused to walls of the vessel, as shown at 10. The marginal edge portions of the filtering body 9 are substantially integral with walls of the vessel as they are fused thereto but the remainder of the filtering body is spaced from the walls of the vessel. Therefore, when liquid is poured into the funnel for passage through the filtering body, it can flow very easily through the walls of the filtering body. Foreign matter will be caught as the liquid passes through the filtering body and accumulate against the outer surface thereof or within the pores of the filtering body.

In Figure 4 another modified form of filter has been illustrated. Referring to this figure, it will be seen that the non-porous vessel 11 is of elongated tubular form and has mounted therein a number of filtering bodies or disks 12, 13, 14 and 15. The lower filtering bodies are of the same construction as the filtering body or disk 4 shown in Figure 1 but are of different degrees of porosity, the disk 14 being coarser than the disk 15. The disks 12 and 13 are also formed of glass strands which are fused to each other, and the disks themselves have their marginal edge portions fused to the walls of the vessel but the strands are either interwoven or merely placed in crossed relation to each other to provide a foraminous structure. Such a filtering body will be effective to remove coarse foreign matter from liquid poured into the filter but will be too coarse to stop fine matter for removal of which the filtering bodies 14 and 15 are provided. The filtering body 12 preferably consists of a single thickness of interwoven or crossed strands although more than one thickness can be used if found desirable and the filtering body 13 has an increased number of layers of strands which may be any number desired and so interwoven that they produce a finer mesh than that of the filtering body 12. By this arrangement, liquid containing a mixture of coarse and fine foreign matter can be poured into the filter and as it flows downwardly through the vessel, the coarsest foreign matter will be removed by the upper filtering body 12, the next grade by the filtering body 13, and finer grades of foreign matter by the filtering bodies 14 and 15. Additional filtering bodies of different degrees of coarseness or porosity can be provided in the vessel, if so desired, it being understood that all will be formed of glass strands fused together in a mold and the filtering bodies then removed from the molds and transferred into the vessel where they are fused to walls of the vessel. Discharge spouts 16 project from the vessel above the filtering bodies or disks so that after a filtering operation has been completed, the stoppers 17 can be removed and the filter thoroughly washed and sterilized.

While the filtering bodies have been shown mounted in vessels of the funnel type including a cylindrical or tapered body from which a spout or neck extends, it is to be understood that the filtering bodies may be fused into tubes or any other chemical apparatus of glass or the like in which they can be conveniently placed and fused to walls thereof. It will also be obvious that apparatus equipped with the improved filtering body or bodies may be used for filtering gases as well as liquids and may also be used for depositing matter in a gas or liquid by first passing a gas or liquid charged with the desired matter through the filter to remove the matter therefrom and then passing a liquid or gas through the filter to absorb the matter previously deposited in or upon the filtering body or bodies.

Having thus described the invention, what is claimed as new is:

1. In a filter, a porous body consisting of a mass of glass strands of predetermined coarseness compressed and fused to each other while under predetermined constant pressure to provide a rigid body of predetermined porosity, and a non-porous glass vessel open at its top and bottom and having said body disposed therein, margins of the body being fused to walls of the vessel.

2. The method of forming a filter consisting of placing a mass of horizontally extending glass strands of predetermined coarseness in a mold, subjecting the mass of strands to predetermined constant pressure to reduce the mass to a predetermined density throughout its area and form a body of predetermined outline and dimensions, heating the mass while under the constant pressure to fuse the strands to each other and form a rigid body of predetermined porosity when cool, allowing the body to cool, placing the body in a vessel of non-porous glass open at its top and bottom, and fusing margins of the body to walls of the vessel throughout the periphery of the body.

3. The method of forming a porous glass article comprising placing a mass of glass strands of predetermined coarseness in a mold, subjecting the mass to predetermined constant pressure while in the mold to reduce the mass to a predetermined density throughout its area and form a body of predetermined outline and dimensions, and heating the mass while under the constant pressure to fuse the strands to each other and form a rigid body of predetermined porosity when cool.

WALTER O. LUERTZING.